US010110574B1

(12) United States Patent
Ziraknejad

(10) Patent No.: US 10,110,574 B1
(45) Date of Patent: Oct. 23, 2018

(54) BIOMETRIC IDENTIFICATION

(71) Applicant: MicroStrategy Incorporated, Vienna, VA (US)

(72) Inventor: Siamak Ziraknejad, Reston, VA (US)

(73) Assignee: MicroStrategy Incorporated, Vienna, VA (US)

(*) Notice: Subject to any disclaimer, the term of this patent is extended or adjusted under 35 U.S.C. 154(b) by 98 days.

(21) Appl. No.: 15/424,213

(22) Filed: Feb. 3, 2017

Related U.S. Application Data

(63) Continuation of application No. 14/598,541, filed on Jan. 16, 2015, now Pat. No. 9,563,761.

(60) Provisional application No. 61/928,692, filed on Jan. 17, 2014.

(51) Int. Cl.
*H04L 29/06* (2006.01)

(52) U.S. Cl.
CPC .......... *H04L 63/06* (2013.01); *H04L 63/0861* (2013.01); *H04L 63/10* (2013.01)

(58) Field of Classification Search
CPC . H04L 63/08; H04L 63/0853; G06K 9/00288; G06K 9/00483
See application file for complete search history.

(56) References Cited

U.S. PATENT DOCUMENTS

| 8,051,168 | B1 | 11/2011 | Boysko | |
|---|---|---|---|---|
| 2004/0019570 | A1 | 1/2004 | Bolle | |
| 2011/0185413 | A1 | 7/2011 | Fujii | |
| 2013/0336545 | A1* | 12/2013 | Pritikin | G06K 9/00892 382/116 |
| 2016/0205067 | A1* | 7/2016 | Cha | H04L 63/0815 709/245 |

OTHER PUBLICATIONS

Wu et al. (2006). Requirements of Federated Trust Management for Service-Oriented Architectures. Retrieved Nov. 13, 2016 from http://delivery.acm.org/10.1145-1510000/1501447/a10-wu.pdf?ip=151.207.250.61&id=1501447&acc=ACTIVE%20SERVICE&key=C15944E53D0ACA63%2E4D4702B0C3E38B35%2E4D4702B0C3E38B35%2E4D4702B0C3E38B35&CFID=693398973&CFTOKEN=58143882&_acm_=14.

* cited by examiner

*Primary Examiner* — Brian F Shaw
(74) *Attorney, Agent, or Firm* — Fish & Richardson P.C.

(57) ABSTRACT

A biometric identifier is received, from a first credential granting authority, is associated with a user and was collected by the first credential granting authority. The biometric identifier is stored in association with the user and the first credential granting authority. Trust data is accessed and enables determination of whether a second credential granting authority trusts biometric identifiers collected by the first credential granting authority. It is determined that the second credential granting authority trusts biometric identifiers collected by the first credential granting authority based on the accessed trust data. Based on the determination that the second credential granting authority trusts biometric identifiers collected by the first credential granting authority, biometric identification of the user using the biometric identifier collected by the first credential granting authority is performed for the second credential granting authority.

20 Claims, 13 Drawing Sheets

BIOMETRIC IDENTIFICATION

CROSS-REFERENCE TO RELATED APPLICATION

This application is a continuation of U.S. application Ser. No. 14/598,541, filed Jan. 16, 2015, now allowed, which claims the benefit of U.S. Provisional Application Ser. No. 61/928,692, filed Jan. 17, 2014. Both of these prior applications are incorporated by reference in their entirety.

TECHNICAL FIELD

This disclosure relates to performing biometric identification.

BACKGROUND

Organizations may issue credentials to persons, for example, to uniquely identify each person. Persons may use the credentials to identify themselves and access resources provided by the organizations.

SUMMARY

In general, one innovative aspect of the subject matter described in this specification can be embodied in methods that include the actions of receiving, at a server system and from a first credential granting authority, a biometric identifier that is associated with a user and that was collected by the first credential granting authority; storing, at the server system, the biometric identifier in association with the user and the first credential granting authority; accessing, at the server system, trust data that enables determination of whether a second credential granting authority trusts biometric identifiers collected by the first credential granting authority; determining, by the server system, that the second credential granting authority trusts biometric identifiers collected by the first credential granting authority based on the accessed trust data; and based on the determination that the second credential granting authority trusts biometric identifiers collected by the first credential granting authority, performing, by the server system and for the second credential granting authority, biometric identification of the user using the biometric identifier collected by the first credential granting authority. Other embodiments of this aspect include corresponding systems, apparatus, and computer programs, configured to perform the actions of the methods, encoded on computer storage devices.

These and other embodiments can each optionally include one or more of the following features. The action of receiving the biometric identifier includes receiving at least one of a voiceprint, a retina scan, an iris scan, and a fingerprint. The action of receiving the biometric identifier includes receiving, from the first credential granting authority, identification data that identifies the biometric identifier as being biometric data of the user. The action of accessing trust data that enables determination of whether the second credential granting authority trusts biometric identifiers collected by the first credential granting authority includes receiving, from the second credential granting authority, a request to inherit the biometric identifier. The action of determining that the second credential granting authority trusts biometric identifiers collected by the first credential granting authority based on the accessed trust data includes determining that the second credential granting authority trusts biometric identifiers collected by the first credential granting authority based on the request to inherit the biometric identifier.

The action of receiving the request to inherit the biometric identifier, includes receiving a request to set up a biometric identifier for the second credential granting authority; based on the request to set up a biometric identifier for the second credential granting authority, sending, from the server system to the second credential granting authority, a request to confirm whether the second credential granting authority trusts the biometric identifier collected by the first credential granting authority; and receiving, from the second credential granting authority, an indication that the second credential granting authority trusts the biometric identifier collected by the first credential granting authority. The action of accessing trust data that enables determination of whether the second credential granting authority trusts biometric identifiers collected by the first credential granting authority includes accessing, in response to receiving the biometric identifier, trust data that enables determination of whether the second credential granting authority trusts biometric identifiers collected by the first credential granting authority.

The action of performing, by the server system and for the second credential granting authority, biometric identification of the user using the biometric identifier collected by the first credential granting authority includes storing, at the server system, the biometric identifier in association with the second credential granting authority; receiving a request related to the second credential granting authority that requires biometric identification of the user; based on the request, accessing, at the server system, the biometric identifier stored in association with the second credential granting authority; and performing biometric identification of the user using the accessed biometric identifier. The action of accessing trust data that enables determination of whether the second credential granting authority trusts biometric identifiers collected by the first credential granting authority includes accessing, in response to receiving the biometric identifier, trust data that enables determination of whether multiple credential granting authorities trust biometric identifiers collected by the first credential granting authority.

The action of determining that the second credential granting authority trusts biometric identifiers collected by the first credential granting authority based on the accessed trust data includes determining that the multiple credential granting authorities trust biometric identifiers collected by the first credential granting authority. The action of performing, by the server system and for the second credential granting authority, biometric identification of the user using the biometric identifier collected by the first credential granting authority includes storing, at the server system, the biometric identifier in association with the multiple credential granting authorities; and performing, by the server system and for the multiple credential granting authorities, biometric identification of the user using the biometric identifier collected by the first credential granting authority.

The action of accessing trust data that enables determination of whether the second credential granting authority trusts biometric identifiers collected by the first credential granting authority includes accessing, in response to receiving the biometric identifier, trust data that enables determination of all credential granting authorities managed by the server system that trust biometric identifiers collected by the first credential granting authority. The action of determining that the second credential granting authority trusts biometric identifiers collected by the first credential granting authority based on the accessed trust data includes determining a subset of the credential granting authorities managed by the server system that trust biometric identifiers collected by the first credential granting authority.

The action of performing, by the server system and for the second credential granting authority, biometric identification of the user using the biometric identifier collected by the first credential granting authority includes storing, at the server system, the biometric identifier in association with the subset of the credential granting authorities managed by the server system; performing, by the server system and for the subset of the credential granting authorities managed by the server system, biometric identification of the user using the biometric identifier collected by the first credential granting authority; and requiring another biometric identifier that is different from the biometric identifier in performing biometric identification of the user for credential granting authorities that are not included in the subset of the credential granting authorities managed by the server system.

The action of accessing trust data that enables determination of whether the second credential granting authority trusts biometric identifiers collected by the first credential granting authority includes receiving a request related to the second credential granting authority that requires biometric identification of the user; and accessing, in response to receiving the request, trust data that enables determination of whether the second credential granting authority trusts biometric identifiers collected by the first credential granting authority. The action of performing, by the server system and for the second credential granting authority, biometric identification of the user using the biometric identifier collected by the first credential granting authority includes based on the determination that the second credential granting authority trusts biometric identifiers collected by the first credential granting authority, accessing, at the server system, the biometric identifier stored in association with the first credential granting authority; and performing biometric identification of the user using the accessed biometric identifier.

The action of accessing trust data that enables determination of whether the second credential granting authority trusts biometric identifiers collected by the first credential granting authority includes accessing trust data that explicitly identifies the first credential granting authority as being trusted by the second credential granting authority. The action of determining that the second credential granting authority trusts biometric identifiers collected by the first credential granting authority based on the accessed trust data includes comparing identification information for the first credential granting authority with the accessed trust data; and determining that the second credential granting authority trusts biometric identifiers collected by the first credential granting authority based on the comparison.

The action of accessing trust data that enables determination of whether the second credential granting authority trusts biometric identifiers collected by the first credential granting authority includes accessing trust data that identifies a level of security trusted by the second credential granting authority. The action of determining that the second credential granting authority trusts biometric identifiers collected by the first credential granting authority based on the accessed trust data includes determining a level of security used by the first credential granting authority in collecting biometric identifiers; comparing the determined level of security used by the first credential granting authority with the accessed trust data; and determining that the second credential granting authority trusts biometric identifiers collected by the first credential granting authority based on the comparison.

The actions further include adding, to an account of the user maintained by the server system, a credential issued by the second credential granting authority based on the user being identified using the biometric identifier collected by the first credential granting authority. The actions further include enabling the user to use a credential issued by the second credential granting authority based on the user being identified using the biometric identifier collected by the first credential granting authority. The actions further include granting access to resources of the second credential granting authority based on the user being identified using the biometric identifier collected by the first credential granting authority.

The trust data is first trust data, and the actions further include accessing, at the server system, second trust data that enables determination of whether a third credential granting authority trusts biometric identifiers collected by the first credential granting authority; determining, by the server system, that the third credential granting authority does not trust biometric identifiers collected by the first credential granting authority based on the second trust data; and based on the determination that the third credential granting authority does not trust biometric identifiers collected by the first credential granting authority, requiring another biometric identifier that is different from the biometric identifier in performing biometric identification of the user for the third credential granting authority. The action of accessing trust data that enables determination of whether a second credential granting authority trusts biometric identifiers collected by the first credential granting authority includes accessing one or more timing conditions that define timing restrictions on when the second credential granting authority trusts biometric identifiers collected by the first credential granting authority.

The action of determining that the second credential granting authority trusts biometric identifiers collected by the first credential granting authority based on the accessed trust data includes evaluating the one or more timing conditions; determining that the one or more timing conditions are satisfied based on evaluation results; and determining that the second credential granting authority trusts biometric identifiers collected by the first credential granting authority based on the accessed trust data and the determination that the one or more timing conditions are satisfied. The action of accessing trust data that enables determination of whether a second credential granting authority trusts biometric identifiers collected by the first credential granting authority includes accessing one or more geographic conditions that define geographic restrictions on when the second credential granting authority trusts biometric identifiers collected by the first credential granting authority.

The action of determining that the second credential granting authority trusts biometric identifiers collected by the first credential granting authority based on the accessed trust data includes evaluating the one or more geographic conditions; determining that the one or more geographic conditions are satisfied based on evaluation results; and determining that the second credential granting authority trusts biometric identifiers collected by the first credential granting authority based on the accessed trust data and the determination that the one or more geographic conditions are satisfied. The action of accessing trust data that enables determination of whether a second credential granting authority trusts biometric identifiers collected by the first credential granting authority includes accessing one or more user-defined conditions that have been set by the user and that define restrictions on ability of credential granting authorities to trust biometric identifiers collected by other credential granting authorities.

The action of determining that the second credential granting authority trusts biometric identifiers collected by the first credential granting authority based on the accessed trust data includes evaluating the one or more user-defined conditions; determining that the one or more user-defined conditions are satisfied based on evaluation results; and determining that the second credential granting authority trusts biometric identifiers collected by the first credential granting authority based on the accessed trust data and the determination that the one or more user-defined conditions are satisfied.

In general, another aspect of the subject matter described in this specification can be embodied in methods that include the actions of receiving, at a server system and from a first credential granting authority, a biometric identifier that is associated with a user and that was collected by the first credential granting authority; storing, at the server system, the biometric identifier in association with the user and the first credential granting authority; accessing, at the server system and in response to receiving the biometric identifier, trust data that enables determination of whether a second credential granting authority trusts biometric identifiers collected by the first credential granting authority; determining, by the server system, that the second credential granting authority trusts biometric identifiers collected by the first credential granting authority based on the accessed trust data; based on the determination that the second credential granting authority trusts biometric identifiers collected by the first credential granting authority, storing, at the server system, the biometric identifier in association with the second credential granting authority; receiving a request related to the second credential granting authority that requires biometric identification of the user; based on the request, accessing, at the server system, the biometric identifier stored in association with the second credential granting authority; and performing biometric identification of the user using the accessed biometric identifier. Other embodiments of this aspect include corresponding systems, apparatus, and computer programs, configured to perform the actions of the methods, encoded on computer storage devices.

In general, another aspect of the subject matter described in this specification can be embodied in methods that include the actions of receiving, at a server system and from a first credential granting authority, a biometric identifier that is associated with a user and that was collected by the first credential granting authority; storing, at the server system, the biometric identifier in association with the user and the first credential granting authority; accessing, at the server system, trust data that enables determination of whether a second credential granting authority trusts biometric identifiers collected by the first credential granting authority; determining, by the server system, that the second credential granting authority trusts biometric identifiers collected by the first credential granting authority based on the accessed trust data; and based on the determination that the second credential granting authority trusts biometric identifiers collected by the first credential granting authority, performing, by the server system and for the second credential granting authority, biometric identification of the user using the biometric identifier collected by the first credential granting authority. Other embodiments of this aspect include corresponding systems, apparatus, and computer programs, configured to perform the actions of the methods, encoded on computer storage devices.

The details of one or more implementations are set forth in the accompanying drawings and the description, below. Other potential features of the disclosure will be apparent from the description and drawings, and from the claims.

DETAILED DESCRIPTION

Figure 1:
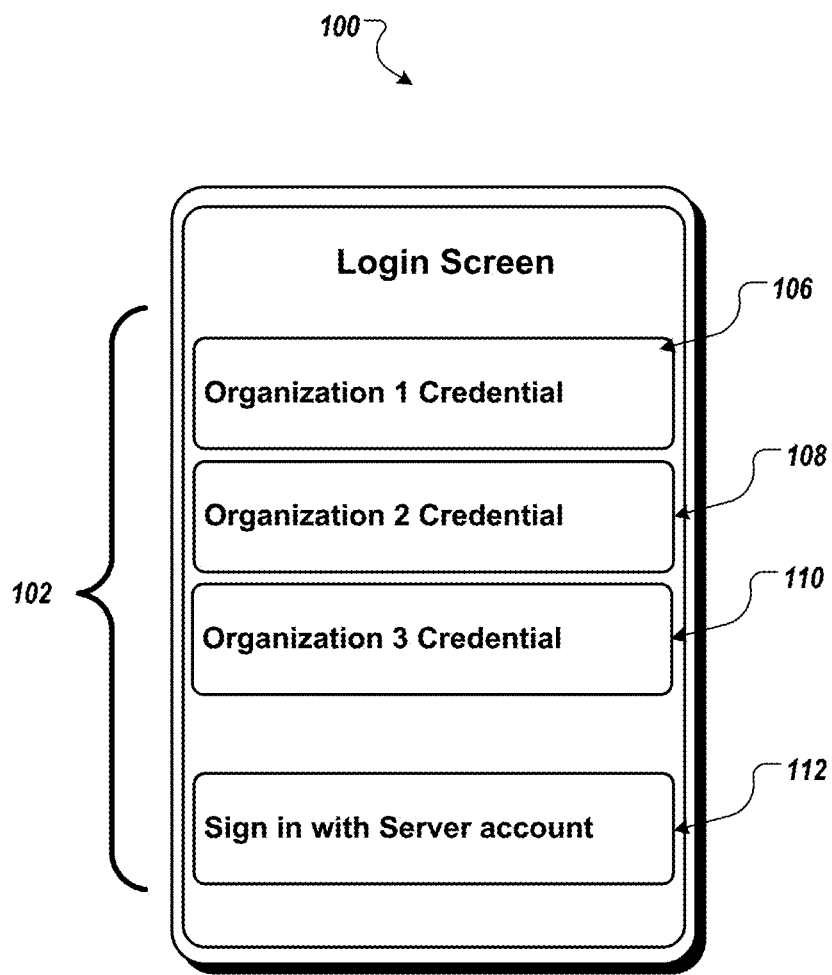
FIGS. 1-9 are diagrams illustrating example user interfaces for displaying credentials and resources associated with credentials.

Techniques are described for inheriting biometric identifiers by credential granting authorities. Within a credential management application, credential granting authorities can issue credentials to users. Multiple credential granting authorities can grant a user a credential and the credentials may be accessible through a credential management application running on a user's device. For example, a user may have an employee credential from Organization 1, a membership credential from Organization 3, and a banking credential from Organization 2, all of which may be accessible through the credential management application. The user may login to the credential management application by through any one of the user's credentials. Once authenticated by the credential management application, the user can access the resources associated with each credential. Each resource provides the user with access to different aspects associated with the credential, such as providing access to various parts of a building or providing access to various user accounts. Before providing a user with access to sensitive resources associated with the credential, a credential granting authority may require that a user provide additional identification verification. A credential granting authority may use a biometric identifier to verify the identity of a user. For example, a user may speak numbers into a client device, and the credential granting authority can grant access to its resources based upon receiving a recording of the user speaking the numbers and authenticating the user based on the user's voice recording.

As part of registering a biometric identifier for a user, such as, for example, a voice print for the user, a credential granting authority may verify the identity of a user. For example, the credential granting authority may verify the identity of a user by viewing a government issued identification. The credential granting authority also may ask the user to read a series of text strings and record the user's voice while doing so. The credential granting authority then may process these recordings to create a voice print. The credential granting authority then may allow the user to access its resources upon matching the user's voice with the collected voiceprint. The voiceprint thus may allow the credential granting authority to authenticate the user without the need for a username and password or as a second layer in addition to a username and password.

In some implementations, a credential granting authority may require a user to provide biometric identification to access a resource before the credential granting authority collects a biometric identifier for the user. For instance, some credential granting authorities may trust a biometric identifier collected by another credential granting authority and allow access to their resources based on the biometric identifier from the trusted credential granting authority. In other words, the credential granting authority may inherit the biometric identifier from the trusted credential granting authority. For example, a user attempting to access the resources of a bank, Organization 2, may be required by Organization 2 to provide a biometric identifier before being allowed to access the desired resources of Organization 2. Previously the user may have registered a biometric identifier with another credential granting authority, Organization 1. When the user attempts to access the resources of Organization 2 using a biometric identifier, the credential management application may determine, by accessing trust data, whether Organization 2 trusts a biometric identifier collected by Organization 1. Responsive to a determination by the credential management application that Organization 2 does trust biometric identifiers collected by Organization 1, the user can use the same biometric identifier that the user previously registered with Organization 1 to access resources of Organization 2 without having to register a new biometric identifier with Organization 2.

FIGS. 1-8 illustrate user interfaces for displaying information related to credentials. These interfaces may be displayed on a client device running a mobile credential management application. In these examples, the interfaces represent the user account of a user of the credential management application on a client device and may include credentials issued by one or more credential granting authorities.

Referring now to FIG. 1, an example user interface 100 is shown that illustrates a list of options 102 for logging into the credential management application. The options 102 include different credential granting authorities that have issued credentials to the user such as Organization 1 as reflected in credential option 106. As shown in FIG. 1, Organization 2 and Organization 3 are reflected in option 108 and option 110, respectively, because Organization 2 and Organization 3 have issued credentials to the user. The options 102 also include a server option 112 that allows the user to log into the credential management application using an option provided by the credential management application. The user may select any of the options 102 to log into the credential management application. When the user selects one of the options 102, for example, option 106 corresponding to Organization 1, another user interface is displayed to the user (as described below in relation to FIG. 2), such as a dialog box, prompting the user to supply the user's authentication information for Organization 1 to log-in to the credential management application.

Figure 2:
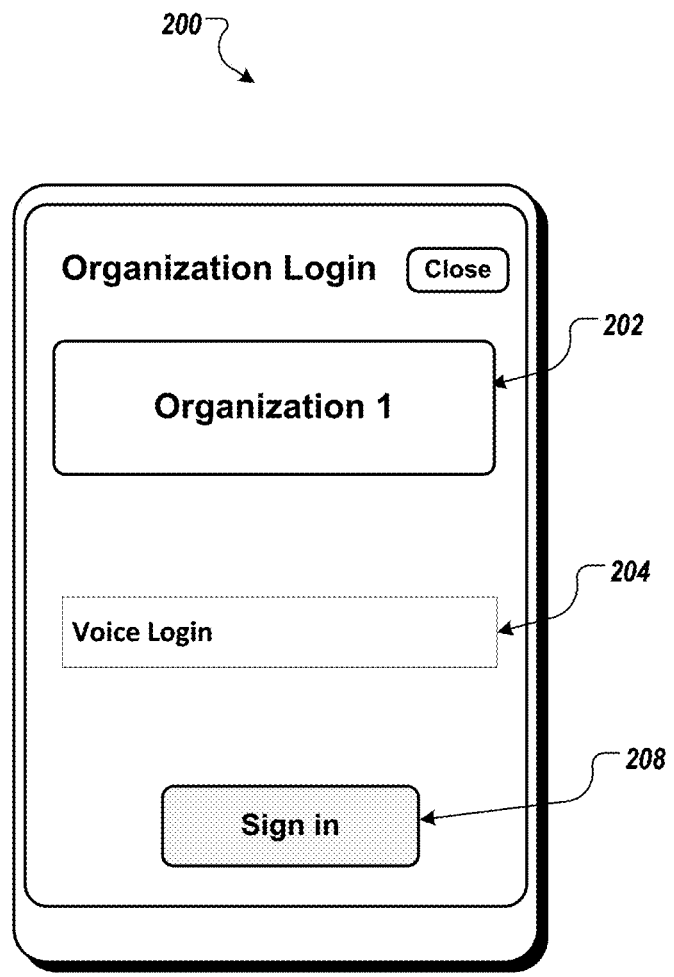
Figure 3:
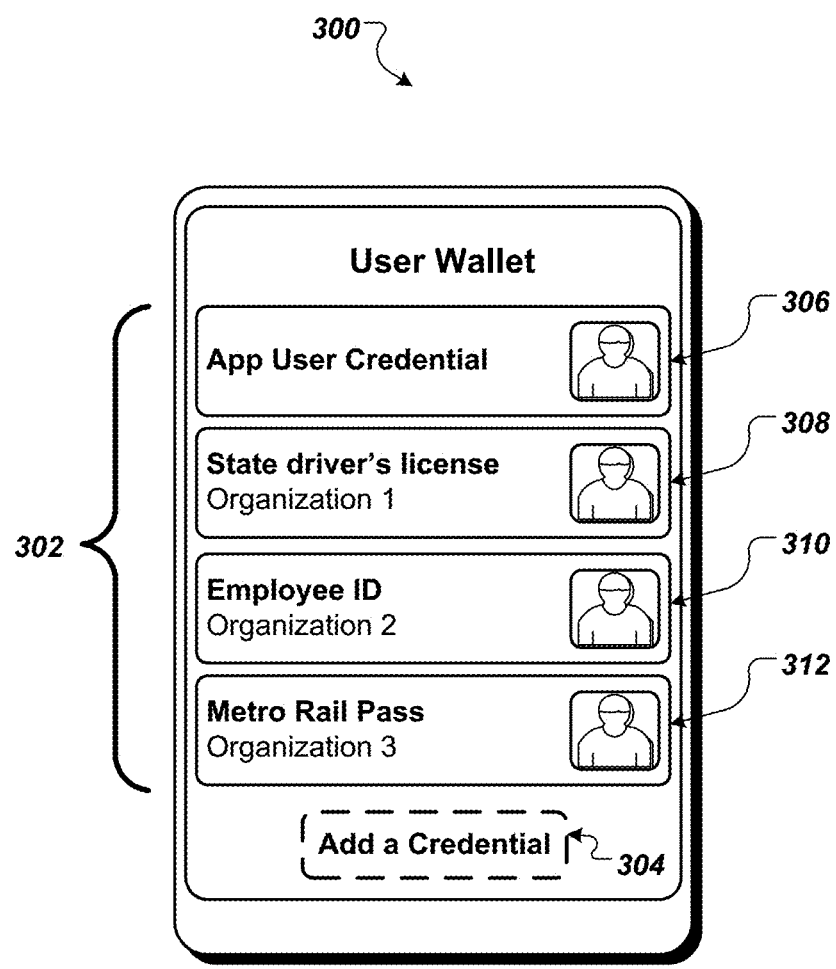

Referring now to FIG. 2, an example user interface 200 is shown that illustrates a log-in screen for a particular user to log into the credential management application. In this example, the user interface 200 provides a text display 202 indicating that the log-in corresponds to Organization 1 and thus the credential management application will authenticate the user using Organization 1's authentication information. Alternatively, the user may be redirected to authenticate himself directly with Organization 1 and then Organization 1 may send a communication to the server or to the user's client device indicating that the user has been authenticated and that the user should be allowed to access the user's credential management application account. The user interface 200 shows a log-in option in which the user can provide a voice login that has been registered with Organization 1 by selecting button 204. In general, though, any suitable type of authentication information and authentication technique may be used.

For example, if the user wishes to access a credential issued by a university, the user may provide a voice login as authentication information. The authentication information required may be different depending on the credential issuing organization. The user may be able to provide as authentication information a voice login when logging into the credential management application using the login option provided by the university. Other login options provided by other credential granting authorities may request authentication information such as user name and password, finger print, retina scan, etc. The authentication information may be confirmed either by a server hosting the credential management application, or by a server at the credential granting authority.

Regardless of which entity processes the user's authentication information and authorizes a user to log-in to the credential management application, the credential management application enables a variety of different credential granting authorities to issue mobile device-based credentials and/or keys through the credential management application. For example, FIG. 4 illustrates an example of a user's credentials issued by different organizations.

Figure 4:
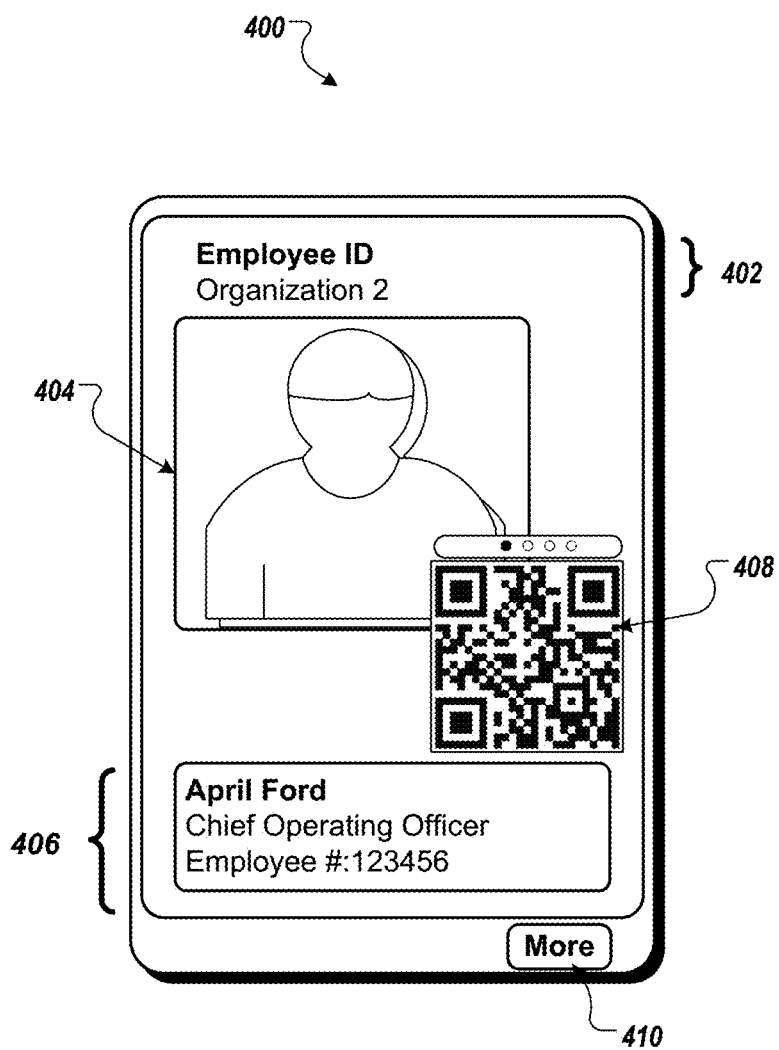

Referring now to FIG. 4, an example user interface 400 is shown that illustrates a collection of the credentials 402 held by a particular user. In this example, the user interface 400 shows four user credentials for the particular user corresponding to credentials issued to the user by different credential granting authorities. The user also may select the "Add a Credential" tab 404 to add new credentials issued to the user by credential granting authorities to the user's account.

In this example, the collection of credentials 402 includes four credentials Option 406 may be selected to access credentials issued by the server that hosts the credential management application. Another credential is a state-issued driver's license, selectable using option 308, issued by Organization 1, for which the user provided log-in information (e.g., using interface 300 in FIG. 3). Another credential is an employee ID, selectable using option 410, issued by Organization 2. The last credential is a metro rail pass, selectable using option 412, issued by Organization 3. The user may select one of the credentials to view the credential. For instance, when the user selects the Employee ID option 410 for Organization 2, the credential is displayed on the user's mobile device, as illustrated in FIG. 5.

Referring now to FIG. 4, an example user interface 400 is illustrated that displays a selected credential. In this example, the selected credential is the employee ID credential that was selected using option 410 for Organization 2 in the user interface 300 of FIG. 3. The user interface 400 includes a description of the selected credential 402 and a picture 404 of the user that holds the credential. Also, the user interface 400 includes some personal information related to the credential holder 406. In some implementations, some or all of the information displayed in the user interface 400 may have been provided by the organization issuing the credential, Organization 2. The interface 400 also includes a validation mechanism 408. The validation mechanism 408 may be used for validation of the user's credential by other users or entities. In the example shown in FIG. 4, the validation mechanism 408 is a Quick Reference (QR) code. Another user or entity may use a validating device to image the QR code, extract credential information encoded within the QR code, and send the extracted credential information to the credential management system (or the credential granting authority) for validation.

In some implementations, as an alternative or in addition to a QR code, the validation mechanism 408 may be an alphanumeric code and/or the validation mechanism 408 may be an indication that credential information is available for transmission using ultrasonic communications, near field communications (NFC), and/or other short-wavelength radio transmissions (e.g., in the ISM band from 2400-2480 MHz), for example, according to the Bluetooth standard. The user interface 500 further includes a button 410 that causes additional information about the credential to be displayed. For instance, when the user selects the button 410, the user's mobile device displays the interface 500 illustrated in FIG. 5.

Figure 5:
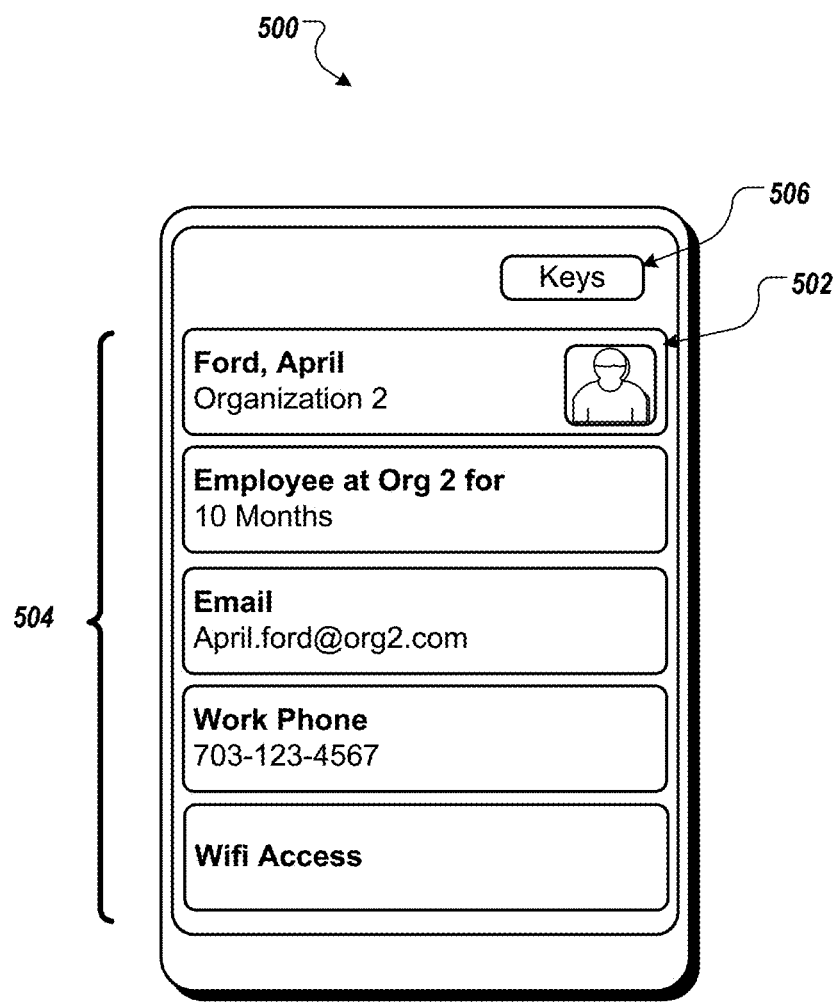

In some implementations, the user interface 400 represents a front of an employee badge and the interface 500 illustrated in FIG. 5 represents a back of the employee badge. In these implementations, when the user selects the button 410, an animation may occur that makes it appear as if the employee badge is being flipped from the front of the badge represented by the user interface 400 to the back of the badge represented by the interface 500 illustrated in FIG. 5.

Referring now to FIG. 5, an example user interface 500 is illustrated that displays additional information about a credential. In this example, the additional information corresponds to the selected credential illustrated in the user interface 400 of FIG. 4, corresponding to the employee ID of Organization 2. The interface 500 displays detailed information 502 that displays the name of the user and the name of the credential granting authority for the particular credential, the email address of the user, the length of time the user has held the credential, and the phone number of the user. Some or all of the detailed information 502 displayed about the credential may be provided by the organization issuing the credential, in this case Organization 2. The user interface 500 also includes a button 504 that causes the display to return to the front of the badge or the user interface illustrated in FIG. 3. The user interface 500 also may include a button 506 that causes the user's mobile device to display any keys that have been issued to the user, in connection with the credential displayed in user interfaces 400 and 500.

When a credential granting authority issues a credential to a user through the credential management application, it also may issue one or more keys to the user (e.g., for the purposes of providing access to one or more physical and/or logical resources controlled by the credential granting authority). For example, when Organization 2 issues an employee ID to the user, it also may issue a number of keys to the user that enable the user to unlock different doors within the Organization 2 office buildings, to gain access to certain floors of the buildings from the building's elevators, to enter/exit the parking garage, to gain access to a computing device, account, or network, etc. In some implementations, the keys are associated with access control systems that regulate access to the physical and/or logical resources and enable the physical and/or logical resources to be locked or unlocked by invocation of a control within the credential management application on the user's mobile device.

Figure 6:
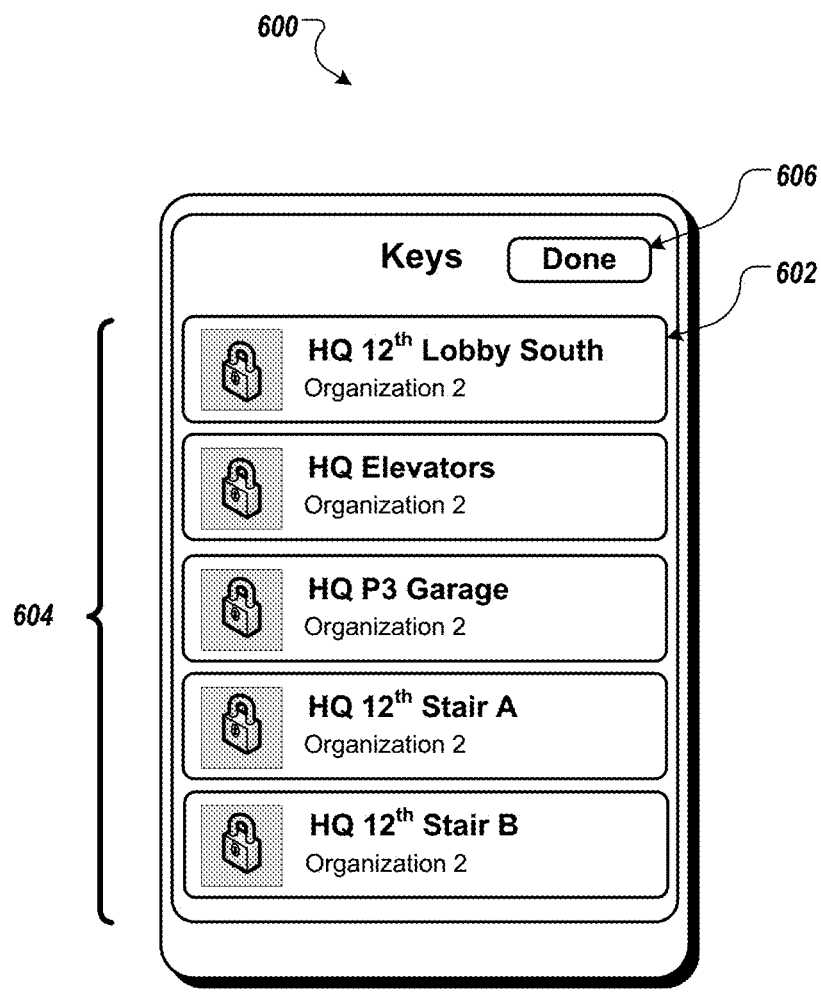

Various examples of different keys that an organization may issue to a user, for example, as part of issuing the user an employee credential through the credential management application are shown in FIG. 6.

Referring now to FIG. 6, an example user interface 600 is illustrated that displays a list of keys associated with a credential. In this example, the user interface 600 shows a list 604 of five keys that have been issued to the user by Organization 2. The keys enable the user to access various physical and/or logical resources that are controlled by Organization 2. The user also may select one of the keys to view details about the key and/or to attempt to use the key to gain access to the corresponding physical or logical resource. For instance, when the user selects the HQ $12^{th}$ Lobby South key, selectable by option 602, information about the key is displayed on the user's mobile device, as illustrated in FIG. 7.

Figure 7:
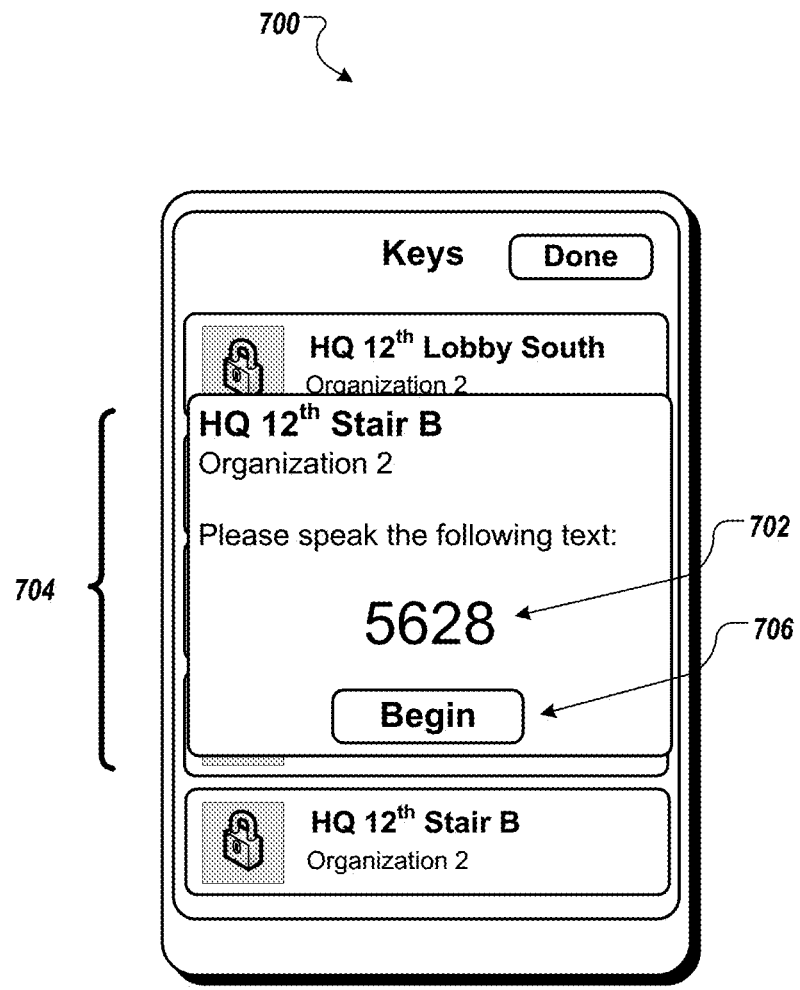

Referring now to FIG. 7, an example user interface 700 is illustrated that displays a prompt 704 to the user to speak a text string 702. In this example, the user selected a key of Organization 2 that required additional authentication to access the key. The user was already logged into the credential management application when the user provided a voice print at prompted in FIG. 2, but because of the sensitivity of the selected key, Organization 2 has chosen to require an additional voice print when accessing the key. In some implementations, biometric identification may be limited to accessing secure resources. As such, the user may have logged into the credential management application using a username and password instead of a voice print. As shown in FIG. 7, the user selected the HQ $12^{th}$ Stair B key and the user interface 700 displayed a prompt 704 for the reader to read the text string 702. The user may select button 706 and begin reading the text string 702. In some implementations, the biometric identifier used to access the HQ 12th Stair B key may have been collected by Organization 2. Alternatively, Organization 2 may have inherited the biometric identifier from a different credential granting authority based on Organization 2 trusting the different credential granting authority.

Figure 8:
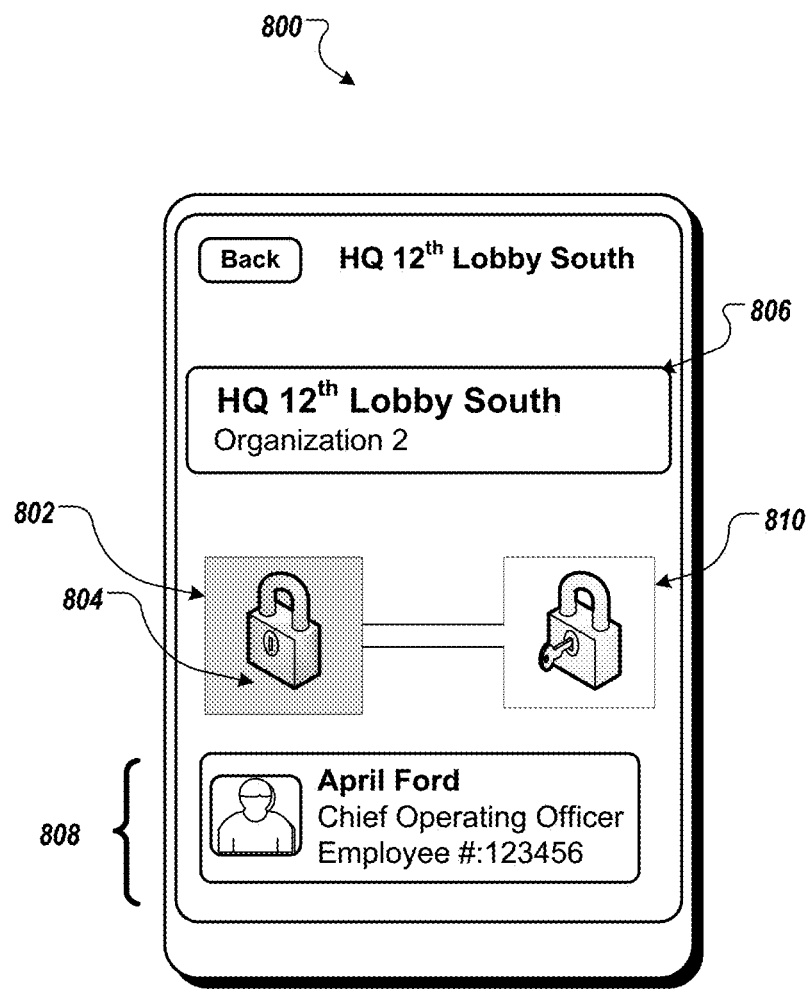

Referring now to FIG. 8, an example user interface 800 is illustrated that displays information about a selected key. The user interface 800 may have been reached by selection of a key in FIG. 6, or by selecting a key in FIG. 6 that prompted an additional voice print request as shown in FIG. 7. The user interface 800 includes a text display 802 that describes the key and a slideable interface component 804 that enables the user to use the key to access a physical resource, in this case a door to the $12^{th}$-floor lobby of the Organization 2 headquarters. The interface 800 also may display information about the user in text display area 806. In this example, the user may use the key to access a physical resource by sliding the key-shaped icon in the slideable interface component 804 from a "locked" position 802 to an "unlocked" position 810. Other types of interface options may be presented by interface 800 for providing access to a physical resource using the key. In this example, when the user slides the slideable interface component 804 to the unlocked position 810, a determination may be made as to whether the user is authorized to open the corresponding door, and, if so, the door opens and a confirmation message is displayed to the user, for example by presenting the interface 900 illustrated in FIG. 9. In some implementations, the determination that the user is authorized to open the door using the key is made prior to presenting the user with the list of keys (e.g., in user interface 600 of FIG. 6).

Figure 9:
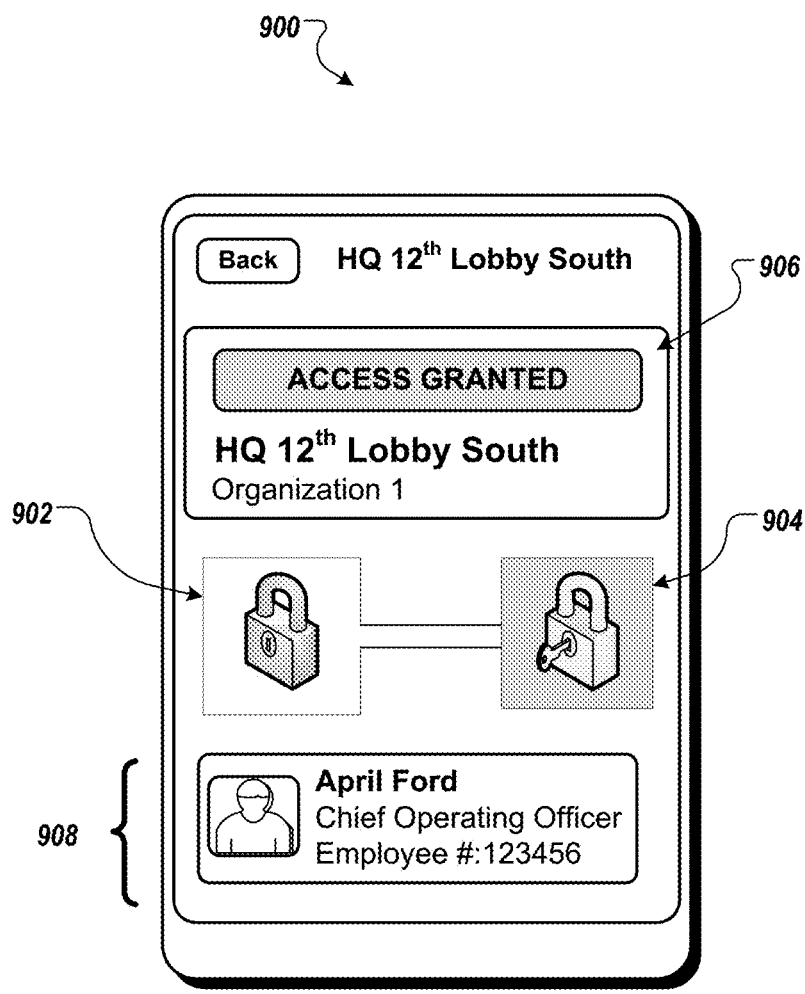

Referring now to FIG. 9, an example user interface 900 is illustrated that displays an indication that a physical resource has been unlocked using a key and is accessible to the user. In this example, a display interface component 902 may be provided indicating that Organization 2 has authorized the door to HQ 12th Lobby South to be opened.

The access of a physical resource using a key can be enabled by any suitable technique. For example, a user's mobile device may use short-range wireless communication signals, such as infrared (e.g., Bluetooth) or near-field communication (e.g., NFC) signals to access a physical resource by placing the mobile phone in close proximity to the physical resource. As another example, the mobile device may access a physical resource indirectly via an intermediate device, such as a relay or a router. Additionally or alternatively, the mobile device may use a wireless network communication signal (e.g., Wi-Fi, cellular, etc.), to access a physical resource over a communication network. For example, the mobile device may send control signals to the credential granting authority via wireless communication (either directly or via the server system), which may then, in turn, control the physical resource. More specifically, the mobile device may send an indication to the server that the user is attempting to access a key on the mobile device. The server may then determine whether the user is authorized to access the location that the user is attempting to access with the key. If the server determines that the user is authorized, then the server can send a signal to an access control system to grant access to the location. In some implementations, the mobile device may use an attached device, such as a dongle, to facilitate access of the physical resource. These are merely some examples of techniques that can be used by a mobile device to access a physical resource as a result of a user of the mobile device attempting to use a key to access the physical resource, and other techniques may be used.

Figure 10:
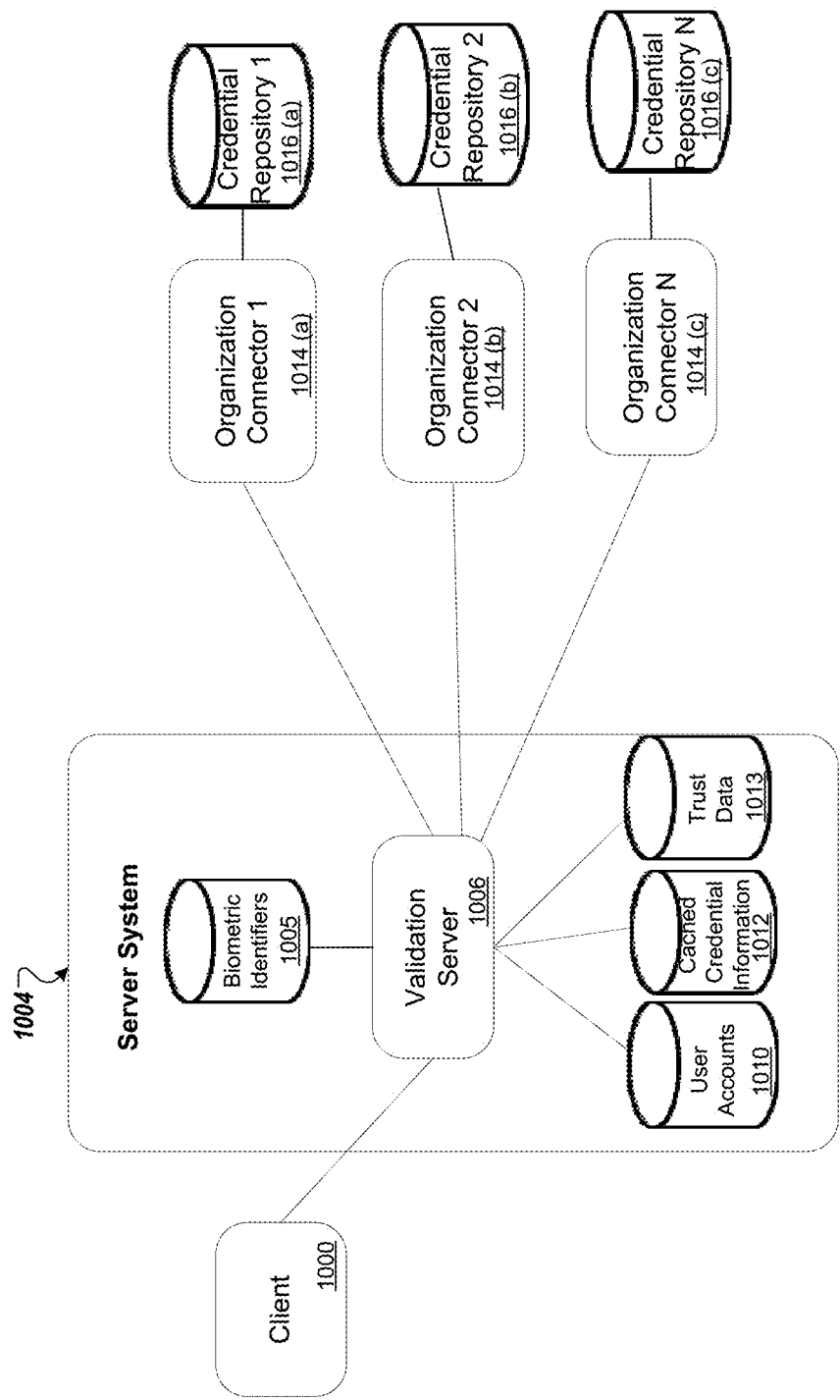
FIG. 10 is a block diagram illustrating an example of a credential managing system.

FIG. 10 illustrates an example of a credential managing system. As illustrated in FIG. 10, the system includes a client device 1000 and a server system 1004. The client device 1000 operates a mobile device-based credential management application. The client device 1000 may include any electronic device that is capable of communicating with the server system 1004 including, but not limited to, a mobile phone, smart phone, personal digital assistant (PDA), electronic book (e-book) reader, tablet computer, laptop, or other device that includes one or more processors and non-transitory computer readable storage media. The credential management application is in communication with the server system 1004. The credential management application acts as a platform for managing credentials issued to multiple, different users by various credential granting authorities.

The server system 1004 includes a validation server 1006, an account data store 1010, a credential data store 1012, trust data 1013, and biometric identifiers 1005. The validation server 1006 is involved in the process of validating credential granting authorities as well as validation of credentials and/or keys. The validation server 1006 authenticates credential granting authorities that would like to make credentials available to users of the credential management system. The validation server 1006 also validates credentials and/or keys held by users of the credential management system through communication with credential management applications operated on user devices. For example, the validation server 1006 can authenticate a user by comparing the biometric identifiers 1005 to a biometric identifier received by a user through the client 1000. As described in greater detail elsewhere, the validation server 1013 may use the trust data 1013 to associate different credential granting authorities with the same biometric identifier.

The user account data store 1010 stores user account information, and the credential data store 1012 stores credential information associated with user accounts. Users of the credential management application may set up a user account that allows the user to store personal information as well as the credentials issued to the user. Each user account may include identification information for the user and credential data that defines credentials held by the user. The system 1004 may maintain accounts for multiple different users with each user account being specific to a user and the credentials held by the specific user.

Credentials (or information related to credentials) issued to a user by a credential granting authority may be cached in the credential data store 1012 until a cache until date associated with the credential passes. The cache until date defines the date that a cached version of the credential may be used without having to communicate with the credential granting authority to confirm the continued validity of the credential. When the cache until date has not passed, the server system 1004 may access, from electronic storage at the server system 1004, a cached version of the credential and use the cached version of the credential to send credential information (e.g., send a user an updated list of the user's credentials) or validate the credential (e.g., confirm to another user that the user's credential is valid). When the cache until date has passed, the server system 1004 communicates with the credential granting authority that issued the credential to receive updated credential information for the credential and then sends credential information or validates the credential based on the updated credential information. For example, an employer may define a cache until date of twenty-four hours for an employee credential issued to an employee by the employer. In this example, if the server system 1004 has received information for the employee credential from the employer's system less than twenty-four hours prior to the employee's attempted use of the credential (e.g., presentation of the credential to gain access to the employer's building), the server system 1004 may validate the use of the employee credential without having to communicate with the employer's system. If not, the server system 1004 communicates with the employer's system to receive updated credential information for the employee credential and validates the use of the employee credential based on the updated credential information for the employee credential.

Credentials also may be associated with an expiration date. When a credential is associated with an expiration date, credential information for the credential may be stored by the server system 1004 until the expiration date. For instance, when the server system 1004 determines that the expiration date of a credential has passed, the server system 1004 may delete the data defining the expired credential and remove the expired credential from the user's account.

The validation server 1006 is in communication with the account data store 1010 and the credential data store 1012, for example, to manage and validate credentials. The validation server 1006 authenticates and establishes connectors 1014(a)-1014(c) with various trusted credential granting authorities 1016(a)-1016(c) as shown in FIG. 10. A connector 1014 may include communication information that the server system 1004 uses to communicate with a credential granting authority 1016. For instance, the communication information may include an electronic address (e.g., a uniform resource locator (URL)) that the server system 1004 uses to communicate with the credential granting authority 1016 and a set of guidelines that govern a format for exchanging communications between the credential granting authority 1014 and the server system 1004. The credential granting authority 1014 programs its system to follow the set of guidelines stipulated by the server system 1004 to enable the two platforms to communicate credential information successfully. The set of guidelines stipulated by the server system 1004 may be published to allow software developers and/or information technology staff to configure the systems at the credential granting authorities 1016 to comply with the set guidelines. A connector 1014 may be established between the system of a credential granting authority 1016 and the server system 1004 when the server system 1004 stores the communication information and the system of the credential granting authority 1016 has been configured to communicate in accordance with the set of guidelines. In some implementations, the communication information defining the connector 1016 may include communication information that enables the credential granting authority 1014 to communicate with the server system 1004 through an Application Programming Interface (API) of the server system 1004. The server system 1004 may store unique communication information for each credential granting authority 1016 and, thus, establish a unique connector 1014 with each credential granting authority 1016. For the sake of brevity, the term connector 1014 is used throughout this disclosure to refer to communication information used in exchanging communications with a credential granting authority and does not necessarily connote a physical connection between the server system 1004 and a system of the credential granting authority 1016, although a physical connection may be used in some implementations.

As shown in FIG. 10, the validation server 1006 has established multiple, different connectors 1014 (a)-(c) for multiple, different credential granting authorities. The credential granting authorities may include one or more universities, one or more companies, and one or more government agencies, among other credential granting authorities. Each credential granting authority maintains a credential repository (e.g., credential repositories 1016 (a)-(c)) on a system operated by the credential granting authority. The systems operated by the credential granting authorities use the connectors 1014 (a)-(c) to communicate credential information from the credential repositories 1016 (a)-(c) to the validation server 1006. For instance, the client device 1000 may wish to display a credential from the credential granting authority associated with the connector 1014 (a). The validation server 1006 first identified the organization as authentic and established the connector 1014 (a) between the server system 1004 and the credential granting authority. Using the connector 1014 (a), the validation server 1006 sends a request to the credential granting authority for credential information of a user of the client device 1000. The credential granting authority accesses data from the credential repository 1016 (a) and uses the connector 1014 (a) to provide credential information from the accessed data to the validation server 1006, which, in turn, provides credential information to the client device 1000 for display through the credential management application. In some implementations, a credential granting authority may provide several types of credentials to a user such that the user's account includes multiple, different credentials issued by the credential granting authority to the user. Additionally or alternatively, a user may receive credentials from several different credential granting authorities such that the user's account includes, at least a first credential issued by a first organization and a second credential issued by a second organization. The credential management system may maintain accounts for many different users, and may manage credentials issued to these users by many different organizations.

Some organizations may use biometric identifiers to authenticate a user. In order to use a biometric identifier to authenticate a user, the server 1004 collects the biometric identifier from the client 1000 and stores the biometric identifier. For example, Organization 1 may indicate to the server 1004 that Organization 1 will allow authentication using biometric identifiers. To collect a biometric identifier, a user may provide biometric information, such as a voice print or finger print, to the server 1004 through the client 1000. In the case of the voice print, the server 1004 may display a text string on the client 1000 for the user to read. The server 1004 receives the biometric identifier and stores it in biometric identifiers 1005 in connection with Organization 1.

The server 1004 may use the biometric identifier to authenticate the user. The server 1004 may authenticate the user before allowing the user to log into the credential management application and/or before the user accesses a key or resource associated with a credential. For example, the server 1004 may receive notification that a user is attempting to log into the credential management application through client 1000. The user may select the option of logging into the credential management application using the Organization 1 credential. Having previously set up a biometric identifier with Organization 1, the server 1004 will prompt the client 1000 for the biometric identifier to authenticate the user. The server 1004 will receive the biometric identifier from the client 1000 and compare the biometric identifier to the saved biometric identifier saved in connection with Organization 1. If the server 1004 determines that the biometric identifiers match, then the server 1004 grants logs the user into the credential management application.

The server 1004 may also use the biometric identifier to authenticate a user when the user attempts to access a resource associated with a credential if requested by the credential granting authority. For example, the user may attempt to use a key associated with Organization 1's credential to open a door. The server 1004 receives notification from the client 1000 that the user is attempting to use the key. The server 1004 determined that that Organization 1 has identified the key as one that requires additional authentication. As such, the server 1004 sends a request to the client 1000 to collect another biometric identifier. The server 1004 receives and compares the collected biometric identifier similarly to when the user logged into the credential management application. If the biometric identifier matches, then the server 1004 sends a signal to access control system to unlock the door that matches the key.

In some implementations, a credential granting authority may trust a biometric identifier collected by another credential granting authority. A credential granting authority trusts a biometric identifier collected by another credential granting authority when the credential granting authority allows the server 1004 to authenticate a user for access to the credential granting authority's credential or resources by using the other credential granting authority's biometric identifier. In other words, the credential granting authority inherits the biometric identifier from the other credential granting authority. When a credential granting authority trusts, or inherits, a biometric identifier collected by another credential granting authority, the server 1004 may copy the biometric identifier associated with the other credential granting authority to the biometric identifiers 1005 associated with the credential granting authority. For example, if Organization 1 trusts biometric identifiers collected by Organization2, then the server 1004 can copy the biometric identifier to biometric identifiers 1005 for Organization 1 when Organization 2 collects the biometric identifier. In some implementations, the biometric identifier is not copied and associated with the credential granting authority that trusts the biometric identifier. Instead, the server 1004 grants access to a resource for a credential granting authority based on a biometric identifier stored and associated with the other credential granting authority. The credential granting authority that collected the biometric identifier retains ownership and control of the biometric identifier. For example, if Organization 1 trusts biometric identifiers collected by Organization 2, then when a user tries to access the resources of his Organization 1 credential, the server 1004 compares the user's biometric sample to the biometric identifier collected by Organization 2 and stored in biometric identifiers 1005. Within biometric identifiers 1005, Organization 1 is not associated with Saving Bank's biometric identifiers.

Figure 10A:
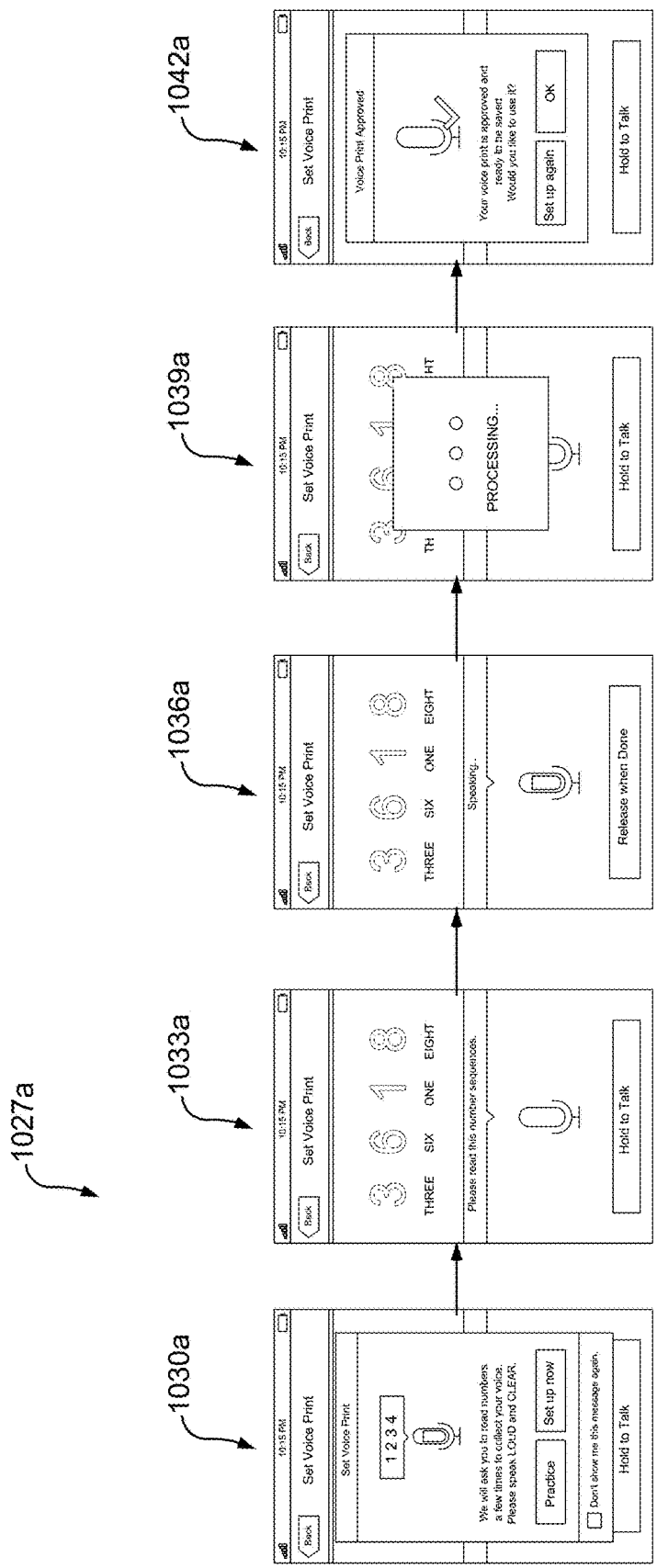
FIG. 10*a* illustrates an example set of screen shots for collecting a biometric identifier.

FIG. 10a illustrates an example process for collecting a biometric identifier for a credential granting authority. In FIG. 10a, the biometric identifier being collected is a voiceprint. The credential granting authority may collect the voiceprint through a client device such as client 1000 while the client 1000 communicates with and receives instructions from the server 1004.

Before a voice print is collected, the credential granting authority verifies the identity of the user. Verification may be performed offline. For example, the user may present a picture identification to a representative from the credential granting authority. Once the representative from the credential granting authority verifies the identity of the user, the representative can indicate to the server 1004 to begin the voice print collection process. The user's identify can also be verified online. For example, the user may have already logged into the credential management application by authenticating through the credential granting authority.

When the server 1004 receives an indication the user's identity has been verified, the server 1004 will notify the device 1000 to begin collecting a voice print as shown in screen 1030a. The user may select the set up now button to begin the collection process. Screen 1033a displays a text string that the user is instructed to read. The text string is determined by the server 1004 and sent to the device 1000 for display to the user. The user selects the talk button and holds the talk button until the user finishes speaking. The talk button will indicate to the user to release the talk button when the user finishes speaking as shown in screen 1036a. When the user is speaking into the device 1000, the device 1000 may be transmitting the speech to the server 1004 in real time, or the device 1000 may record the user's voice and transmit the recording to the server 1004 when the user finishes speaking. The server 1004 processes the user's voice and sends an indication of the processing to the device 1000 as shown in screen 1039a. Once the processing is complete, the server 1004 sends an indication to the device 1000 and the device 1000 displays screen 1042a. The server stores the processed voice print and an identifier of the credential granting authority that collected the voice print in biometric identifiers 1005. When the user attempts to access a resource associated with the credential granting authority that requires biometric identification, the server 1004 accesses the biometric identifier 1005 and compares the stored data to a voice sample received from the user during authentication.

Figure 10B:
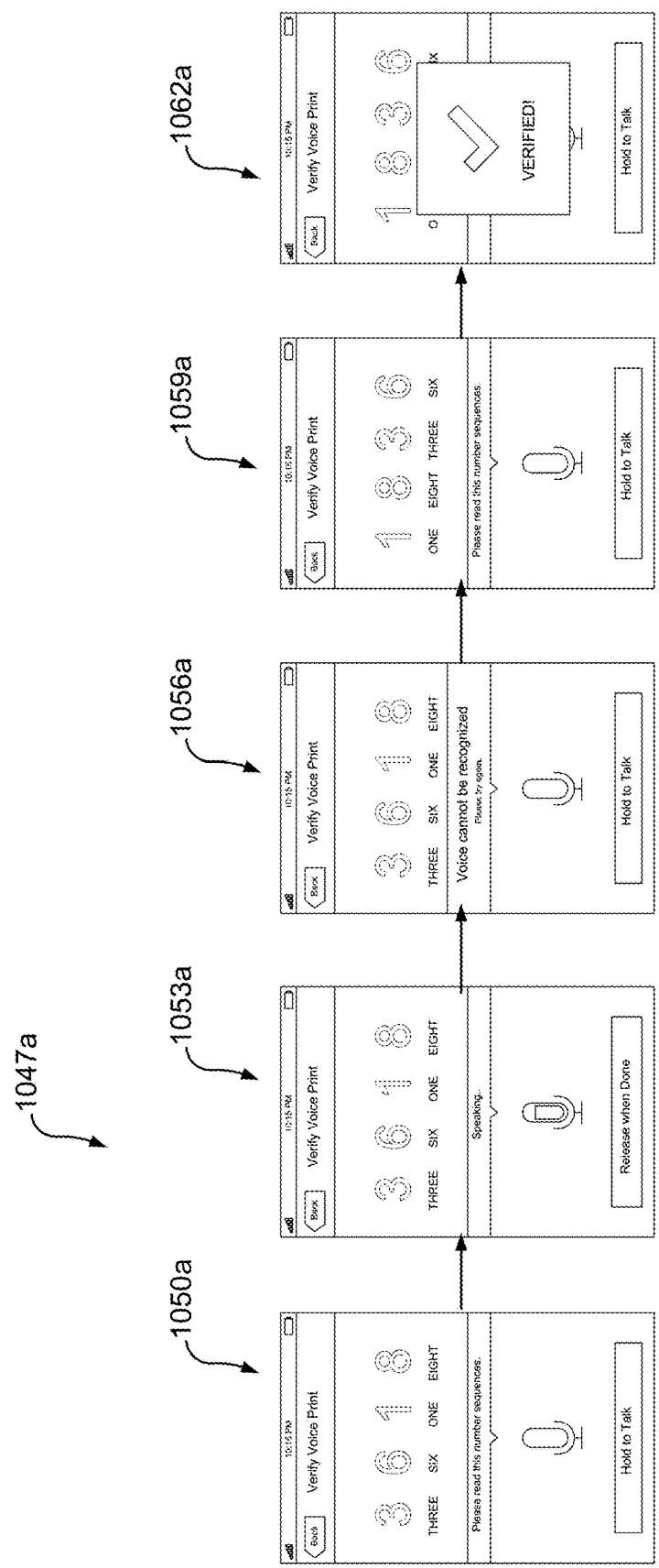
FIG. 10*b* illustrates an example set of screen shots for performing biometric identification.

FIG. 10b illustrates an example process for verifying a biometric identifier. In FIG. 10b, the biometric identifier being verified is a voiceprint. The server 1004 may verify the voiceprint through a client device, such as device 1000. The server 1004 may prompt the device 1000, and thus the user, for a voice print if the user attempts to access a resource that a credential granting authority has indicated as a resource that requires biometric authentication. The server 1004 also confirms that the biometric identifiers 1005 contains a biometric identifier for the user and that is trusted by the credential granting authority. The server 1004 may access the trust data 1013 to determine if a particular biometric identifier is trusted by the credential management authority.

The process 1047b begins with the device 1000 receiving a request to collect a voice recording of the user. The client device may receive the request from a credential server 1004 based on the user requesting to access a resource associated with a credential granting authority that requires biometric authentication. The device 1000 presents the user with text to read in screen 1050b, and the client device records the user's voice in screen 1053b. The server 1004 processes the voice recording and determines if the user can be verified. If the server 1004 verifies the voice of the user, then the device 1000 displays screen 1062b and permits access to the resource. If the server 1004 is unable to verify the voice of the user, then the device 1000 displays screen 1056b and different text to the user to read in screen 1059b.

Figure 11:
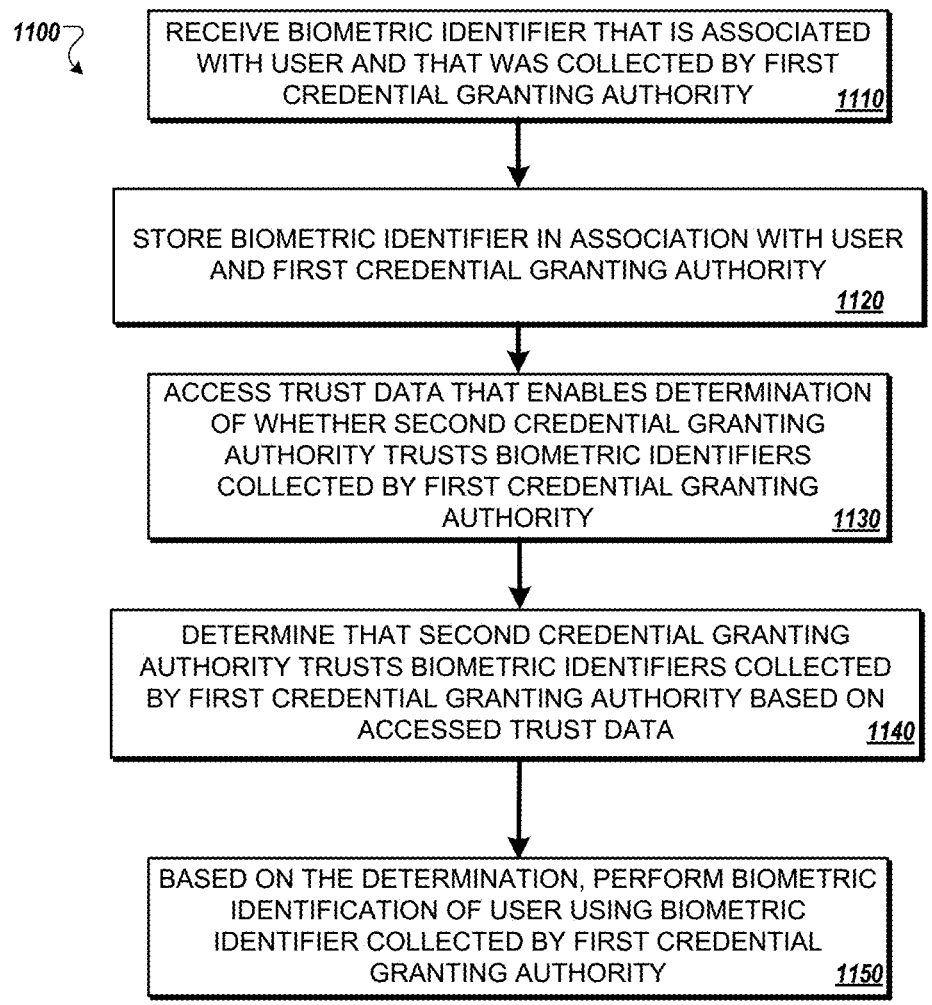
FIG. 11 illustrates an example process for performing biometric identification.

FIG. 11 illustrates an example process 1100 for inheriting a biometric identifier. The operations of the process 1100 are described generally as being performed by the server 1004. The operations of the process 1100 may be performed by one of the other components of the system shown in FIG. 10 or may be performed by a combination of the components of the system shown in FIG. 10. In some implementations, operations of the process 1100 may be performed by one or more processors included in one or more electronic devices.

The server 1004 receives, from a first credential granting authority, a biometric identifier that is associated with a user and that was collected by the first credential granting authority (1110). For example, the credential granting authority may choose resources that require biometric authentication. The resources may be particular keys that require access particular sensitive areas or the credential granting authority may require users to provide biometric authentication to access the credential granting authority's credential instead of a username and password. In some implementations, the biometric identifier may be a voiceprint, a retina scan, an iris scan, and/or a fingerprint, among other biometric identifiers. When a user registers a biometric identifier with the first credential granting authority, the first credential granting authority verifies the identity of the user. In some implementations, the first credential granting authority receives a username and password from the user to verify the identity of the user. In some implementations, the first credential granting authority may verify the identity of the user offline such as with a picture ID. Once the credential granting authority has verified the user, the credential granting authority can collect a biometric identifier. In some implementations, the credential granting authority collects the biometric identifier by recording the voice of the user reading a text string. During or after collection of the biometric identifier, the server 1004 receives data indicating that the first credential granting authority verified the user and is the user associated with the biometric data.

The server 1004 stores the biometric identifier in association with the user and the first credential granting authority (1120). For example, the server may store the biometric identifier in a database where each database entry contains a biometric identifier, data identifying the user associated with the biometric identifier, and data identifying one or more credential granting authorities associated with the biometric identifier. In some implementations, the biometric identifiers may be stored within the server 1004 as shown in FIG. 10, with the biometric identifiers 1005.

The server 1004 accesses trust data that enable a determination of whether a second credential granting authority trusts biometric identifiers collected by the first credential granting authority (1130). For example, the second credential granting authority may require biometric identification to be able to access resources of the second credential granting authority. The second credential granting authority may not require that the use a biometric identifier collected directly by the second credential granting authority to access the resources of the second credential granting authority. Instead, the second credential granting authority can choose to trust the first credential granting authority's biometric identifier and use it to allow regulate the user's ability to access the resources of the second credential granting authority. To determine whether the second credential granting authority trusts the first credential granting authority's biometric identifier, the server 1004 accesses trust data. In some implementations, the trust data may be stored within the server 1004 as shown in FIG. 10, with the trust data 1013. In some implementations, the trust data contains data that identifies the credential granting authorities that a particular credential granting authority trusts for collecting a biometric identifier. For example, the trust data may contain data that indicates that Organization 1 trust biometric identifiers associated with Organization 2 and Organization 3. The Organization 2 or Organization 3 biometric identifiers may be ones that were collected by either Organization 2 or Organization 3 or may be ones that were inherited by either Organization 2 or Organization 3. In some implementations, the trust data 1013 may be provided and modified by the credential granting authority. For example, Organization 1 may instruct the server 1004 to add that biometric identifies collected by Organization 2 are trusted by Organization 1. Conversely, Organization 1 may instruct the server 1004 to change the data indicating that biometric identifies collected by Organization 2 are trusted by Organization 1 to Organization 1 not trusting biometric identifiers collected by Organization 2.

The server 1004 may also access trust data when a user attempts to access a key associated with a particular credential, but when the user has not been authenticated by the credential granting authority associated with the key. For example, a user provides a biometric identifier, collected by Organization 1, to log in to the credential management application through Organization 1. The user attempts to access a key associated with a credential from Organization 2. The server 1004 receives notification that the user is attempting to access a key for Organization 2. Before granting access to the location associated with the key, the server 1004 accesses trust data to determine if Organization 2 trusts biometric identifiers collected by Organization 1.

The server 1004 determines that the second credential granting authority trusts biometric identifiers collected by the first credential granting authority based on the accessed trust data (1140). For example, the trust data may contain data that indicates that Organization 1 trusts biometric identifiers collected by Organization 2. Based on this trust data, the server 1004 determines that Organization 1 trusts biometric identifiers collected by Organization 2.

In some implementations, the server 1004 confirms whether the second credential granting authority trusts the biometric identifier collected by the first credential granting authority. The server 1004 may confirm whether the second credential granting authority trusts the biometric identifier collected by the first credential granting authority by sending a request for confirmation to the first credential granting authority. For example, the server 1004 may receive a request from Organization 1 to begin requiring biometric identification. The server 1004 accesses the trust data and determines that Organization 1 has requested to inherit the biometric identifier collected by Organization 2. The server 1004 sends a request to Organization 1 to confirm that Organization 1 trusts the biometric identifiers collected by Organization 2. Organization 1 sends a confirmation that it trusts the biometric identifiers collected by Organization 2, and based on this confirmation, the server 1004 determines that Organization 1 trusts the biometric identifiers collected by Organization 2.

In some implementations, the trust data may explicitly indicate that the second credential granting authority trusts the first credential granting authority. For example, the trust data may contain a unique identifier for each credential granting authority. The unique identifier for each credential granting authorities may be associated with the unique identifiers of other credential granting authorities that the credential granting authority trusts. Using this trust data, the server 1004 compares identification information of the first credential granting authority with the trust data. The identification information may contain the name of the first credential granting authority, a location of the first credential granting authority, an IP address associated with the first credential granting authority, and/or other information. Based on the comparison by the server 1004, the server 1004 may determine that the first credential granting authority is the same as the one referenced in the trust data and thus determine that the second credential granting authority trusts the biometric identifier collected by the first credential granting authority. For example, the trust data may contain data indication that Organization 1 explicitly trusts Organization 2. The trust data may further indicate that Organization 2 is located in Springfield and is associated with an IP address of 255.255.255.255. The server 1004 may compare this trust data with identification information for Organization 2. There may be more than one credential granting authority named Organization 2. One may be in Springfield and associated with IP address 255.255.255.255 and the other may be in Greenville and associated with IP address 128.128.128.128. The server 1004 may determine that the Organization 2 in Springfield and associated with IP address 255.255.255.255 is the one trusted by Organization 1, and thus Organization 1 trusts biometric identifiers collected by Organization 2.

In some implementations, the trust data indicates a level of security that the second credential granting authority trusts. The server 1004 determines the level of security that the first credential granting authority used when collecting the biometric identifier. If the level of security trusted by the second credential granting authority is satisfied by the level of security used by the first credential granting authority, then the server 1004 determines that the second credential granting authority trusts biometric identifiers collected by the first credential granting authority. A credential granting authority may specify that it trusts a level of security at or above a certain level. For example, a credential granting authority may trust level 3 security and any levels more secure. The level of security may be an encryption level used to store the biometric identifier, the identification type(s) required by the first credential granting authority when verifying the identity of the user, and/or an encryption level used to transmit the biometric identifier during authentication, among other factors related to security levels. For example, the trust data may contain data indicating that Organization 1 trusts biometric identifiers collected when the identity of the user was verified using a passport. The server 1004 may determine based on data provided by Organization 2, that Organization 2 requires a passport when verifying a user's identity when collecting a biometric identifier. Based on this requirement, the server 1004 may determine that Organization 1 trusts biometric identifiers collected by Organization 2. In some implementations, a third party may determine the level of security used by a credential granting authority. For example, an encryption verification entity may verify that the encryption protocol used to encrypt and store the biometric identifier is AES.

In some implementations, the trust data indicates a timing restriction for the second credential granting authority to trust a biometric identifier collected by the first credential granting authority. The server 1004 determines timing conditions that are associated with the biometric identifier collected by the first credential granting authority. If the conditions are satisfied, then the server 1004 determines that the second credential granting authority trusts biometric identifiers collected by the first credential granting authority. The timing restrictions may require that the first credential granting authority have had collected the biometric identifier within a particular time period (e.g., the last week, month, year, etc.). For example, the trust data may contain data that indicates that Organization 1 trusts biometric identifiers collected by Organization 2 if the biometric identifiers were collected within one year. In this example, if the server 1004 determines that the biometric identifier collected by Organization 2 was collected five months ago, then the server 1004 determines that the biometric identifier collected by Organization 2 satisfies the timing conditions specified by Organization 1 and, thus, Organization 1 trusts this particular biometric identifier collected by Organization 2. In some implementations, the timing restriction may be based on when the user is attempting to access the resources of the credential. A credential granting authority may choose to trust biometric identifiers collected by other credential granting authorities only during specific time periods. For example, Organization 1 may agree to trust biometric identifiers collected by Organization 2 if the user was attempting to access the Organization 1 resources between 9 am and 5 pm on Monday through Friday. During other times, Organization 1 may not trust biometric identifiers collected by Organization 2.

In some implementations, the trust data indicates geographic restrictions for the second credential granting authority to trust a biometric identifier collected by the first credential granting authority. The server 1004 determines geographic conditions that are associated with the biometric identifier collected by the first credential granting authority. If the conditions are satisfied, then the server 1004 determines that the second credential granting authority trusts biometric identifiers collected by the first credential granting authority. The geographic restrictions may require that the first credential granting authority have had collected the biometric identifier within a particular country or that the collection of the biometric identifier occurred within particular distance of the location of the first credential granting authority. For example, the trust data may contain data that indicates that Organization 1 trusts biometric identifiers collected by Organization 2 if the biometric identifiers were collected within ten miles of the location of Organization 2. The location of Organization 2 as known by the server 1004 may be Springfield. The location of the collection of biometric identifiers collected by Organization 2 may be determined to be within seven miles of Springfield based on an IP address of the collection. Because the distance is within the conditions of Organization 1, the server 1004 determines that Organization 1 trusts this particular biometric identifier collected by Organization 2. In some implementations, a credential granting authority may trust a biometric identifier collected by another credential granting authority if the user is attempting to access resources associated with the credential in a particular region. For example, Organization 1 may trust a biometric identifier collected by Organization 2 if the user is attempting to access resources associated with the Organization 1 credential while in Springfield. Conversely, Organization 1 may not trust a biometric identifier collected by Organization 2, if the user is attempting to access resources associated with the Organization 1 credential while outside of Springfield.

The server 1004 performs, based on the determination that the second credential granting authority trusts biometric identifiers collected by the first credential granting authority, biometric identification of the user using the biometric identifier collected by the first credential granting authority (1150). In the case of a voice print, the server 1004 prompts the user through the user's device, such as device 1000, to read a text string presented on the device 1000. The user reads the text string and the device sends the voice sample to the server 1004. The server performs biometric identification by comparing the voice sample to the voice print stored in the biometric identifiers 1005.

In some implementations, the server 1004 accesses the trust data in response to receiving the biometric identifier. The server 1004 stores the biometric identifier in association with the second credential granting authority based on the trust data indicating that the second credential granting authority trusts biometric identifiers collected by the first credential granting authority. The server 1004 receives a request to access resources of the second credential granting authority and, to access those resources, the server 1004 determines that the second credential granting authority requires biometric identification of the user. The server 1004 accesses the stored biometric identifier and compares it to a biometric sample received from the user. In some implementations, the stored biometric identifier is stored within the server 1004 as shown in FIG. 10 with biometric identifiers 1005.

In some implementations, the server 1004 accesses the trust data in response to receiving the biometric identifier. The server 1004 may determine that multiple credential granting authorities trust biometric identifiers collected by the first credential granting authority. In this instance, the server 1004 may store the biometric identifier in association with the multiple credential granting authorities. The server 1004 may access the stored biometric identifier and compare it to a biometric sample received from the user. For example, if Organization 1 may require that users access resources associated with Organization 1 using a biometric identifier. To initiate the process of enrolling a user in biometric identification, the server 1004 determines whether Organization 1 trusts biometric identifiers collected by Organization 2. In making that determination, the server 1004 may also determine that Organization 5 and Organization 6 trust biometric identifiers collected by Organization 2. The server 1004 may then store the biometric identifier collected by Organization 2 in association with Organization 5, Organization 6, and Organization 1. When the user attempts to access resources associated with any of the credentials issued by Organization 5, Organization 6, or Organization 1 that require biometric identification, the user will provide a biometric identifier and the server 1004 will perform biometric identification based on biometric identifiers collected by Organization 2.

In some implementations, the trust data includes data sufficient to determine all of the credential granting authorities managed by the server system that trust biometric identifiers collected by the first credential granting authority. In such implementations, upon collection of a biometric identifier of a user by the first credential granting authority, the server 1004 evaluates the trust data against the credential granting authorities that have granted credentials to the user and determines a subset of the credential granting authorities that trust the first credential granting authority. The server 1004 then may store the biometric identifier of the user collected by the first credential granting authority in association with the subset of the credential granting authorities. Accordingly, when the user attempts to perform biometric authentication for one of the subset of the credential granting authorities, the server 1004 may access the stored biometric identifier of the user collected by the first credential granting authority and use it for the biometric authentication. However, when the user attempts to perform biometric authentication for one of the credential granting authorities not included in the subset, the server 1004 requires another biometric identifier that is different from the biometric identifier of the user collected by the first credential granting authority to perform biometric authentication. In this regard, the server 1004 requires a biometric identifier collected by a credential granting authority other than the first credential granting authority.

In some implementations, the server 1004 accesses trust data in response to the user trying to access a resource associated with the second credential granting authority that requires a biometric identifier. For example, the user may not have registered a biometric identifier directly with the second credential granting yet, but the user may try to access a resource associated with the second credential granting authority using a biometric identifier anyway. In this instance, the server 1004 determines whether the second credential granting authority trusts biometric identifiers collected by the first credential granting authority (or any other credential granting authority) and uses the biometric identifier collected by the first credential granting authority to perform biometric identification of the user as a consequence of having determined that the second credential granting authority trusts biometric identifiers collected by the first credential granting authority and as a consequence of having determined that the first credential granting authority has collected a biometric identifier for the user. For example, a user may try to access a resource associated with Organization 1 that requires a biometric identifier but before the user has registered a biometric identifier directly with Organization 1. Upon trying to access the resource associated with Organization 1, the server 1004 accesses trust data and determines that Organization 1 trusts biometric identifiers associated with Organization 2. The server 1004 can then use the biometric identifier collected from the user by Organization 2 to perform biometric identification of the user.

In some implementations, the server 1004 can further add to an account of the user, a credential issued by the second credential granting authority based on the user being identified using the biometric identifier. For example, if the user requests to add a credential for Organization 1 and Organization 1 requires biometric authentication of a user before allowing the user to add an ABC credential, the server 1004 may determine that Organization 2 has collected a biometric identifier for the user and that Organization 1 trusts biometric identifiers collected by Organization 2. Consequently, the server 1004 can add the credential for Organization 1 to the user's account based on input matching the biometric identifier collected by Organization 2.

In some implementations, the server 1004 may determine that the second credential granting authority does not trust biometric identifiers collected by the first credential granting authority. In this instance, the server 1004 may require that another biometric identifier be used to identify the user when trying to access a resource associated with the second credential granting that requires biometric authentication. For example, Organization 4 may require biometric identification to access the resources associated with Organization 4's credential. The server 1004 may determine that the Organization 4 does not trust biometric identifiers collected by Organization 2 and that the user has not registered biometric identifiers with credential granting authorities. Consequently, the server 1004 may require that, in order to use a biometric identifier to access the resource of the Organization 4, the user needs to have a biometric identifier collected by the Organization 4.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. A computer may include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method comprising:
    accessing, by a client device, a first credential that is granted by a first credential granting authority;
    after accessing the first credential that is granted by the first credential granting authority, receiving, by the client device, a request to set up biometric identification for the first credential and the first credential granting authority;
    in response to receiving the request to set up biometric identification for the first credential and the first credential granting authority, providing, for display by the client device, data indicating instructions for a user to provide a biometric identifier;
    receiving, by the client device, the biometric identifier;
    accessing, by the client device, a second credential that is granted by a second credential granting authority;
    after accessing the second credential that is granted by the second credential granting authority, receiving, by the client device, a request to set up biometric identification for the second credential and the second credential granting authority; and
    in response to receiving the request to set up biometric identification for the second credential and the second credential granting authority, providing, for display by the client device, data indicating that the second credential granting authority has authorized biometric identification using the biometric identifier received for the first credential granting authority.

2. The method of claim 1, wherein receiving the biometric identifier comprises receiving at least one of a voiceprint, a retina scan, an iris scan, and a fingerprint.

3. The method of claim 1, wherein receiving the biometric identifier comprises:
    providing, for display by the client device, a text string and an instruction for the user to speak the text string;
    receiving audio data that corresponds to an utterance of the text string;
    determining that the audio data corresponds to the text string;
    based on determining that the audio data corresponds to the text string, providing, for display by the client device, data indicating an acceptance of the audio data as the biometric identifier.

4. The method of claim 1, wherein receiving the biometric identifier comprises:
    providing, for display by the client device, a text string and an instruction for the user to speak the text string;
    receiving audio data that corresponds to an utterance of the text string;
    determining that a quality of the audio data does not satisfy a quality threshold;
    based on determining that the quality of the audio data does not satisfy the quality threshold, providing, for display by the client device, a different text string and an instruction for the user to speak the different text string.

5. The method of claim 1, comprising:
    receiving, by the client device, a request to access a resource restricted by the second credential granting authority; and
    providing, for display by the client device, a request for the biometric identifier.

6. The method of claim 5, comprising:
    receiving, by the client device and from the user, biometric data;
    providing, for display by the client device, data indicating that the biometric data does not match the biometric identifier; and
    in response to providing the data indicating that the biometric data does not match the biometric identifier, providing, for display by the client device, a request for a different biometric identifier.

7. The method of claim 5, comprising:
    receiving, by the client device and from the user, biometric data;
    providing, for display by the client device, data indicating that the biometric data matches the biometric identifier; and
    in response to providing the data indicating that the biometric data matches the biometric identifier, providing, for display by the client device, an interface indicating access to the resource restricted by the second credential granting authority.

8. A system comprising:
    one or more computers and one or more storage devices storing instructions that are operable, when executed by the one or more computers, to cause the one or more computers to perform operations comprising:
        accessing, by a client device, a first credential that is granted by a first credential granting authority;
        after accessing the first credential that is granted by the first credential granting authority, receiving, by the client device, a request to set up biometric identification for the first credential and the first credential granting authority;
        in response to receiving the request to set up biometric identification for the first credential and the first credential granting authority, providing, for display by the client device, data indicating instructions for a user to provide a biometric identifier;
        receiving, by the client device, the biometric identifier;
        accessing, by the client device, a second credential that is granted by a second credential granting authority;
        after accessing the second credential that is granted by the second credential granting authority, receiving, by the client device, a request to set up biometric identification for the second credential and the second credential granting authority; and in response to receiving the request to set up biometric identification for the second credential and the second credential granting authority, providing, for display by the client device, data indicating that the second credential granting authority has authorized biometric identification using the biometric identifier received for the first credential granting authority.

9. The system of claim 8, wherein receiving the biometric identifier comprises receiving at least one of a voiceprint, a retina scan, an iris scan, and a fingerprint.

10. The system of claim 8, wherein receiving the biometric identifier comprises:
   providing, for display by the client device, a text string and an instruction for the user to speak the text string;
   receiving audio data that corresponds to an utterance of the text string;
   determining that the audio data corresponds to the text string;
   based on determining that the audio data corresponds to the text string, providing, for display by the client device, data indicating an acceptance of the audio data as the biometric identifier.

11. The system of claim 8, wherein receiving the biometric identifier comprises:
   providing, for display by the client device, a text string and an instruction for the user to speak the text string;
   receiving audio data that corresponds to an utterance of the text string;
   determining that a quality of the audio data does not satisfy a quality threshold;
   based on determining that the quality of the audio data does not satisfy the quality threshold, providing, for display by the client device, a different text string and an instruction for the user to speak the different text string.

12. The system of claim 8, wherein the operations further comprise:
   receiving, by the client device, a request to access a resource restricted by the second credential granting authority; and
   providing, for display by the client device, a request for the biometric identifier.

13. The system of claim 12, wherein the operations further comprise:
   receiving, by the client device and from the user, biometric data;
   providing, for display by the client device, data indicating that the biometric data does not match the biometric identifier; and
   in response to providing the data indicating that the biometric data does not match the biometric identifier, providing, for display by the client device, a request for a different biometric identifier.

14. The system of claim 12, wherein the operations further comprise:
   receiving, by the client device and from the user, biometric data;
   providing, for display by the client device, data indicating that the biometric data matches the biometric identifier; and
   in response to providing the data indicating that the biometric data matches the biometric identifier, providing, for display by the client device, an interface indicating access to the resource restricted by the second credential granting authority.

15. A non-transitory computer-readable medium storing software comprising instructions executable by one or more computers which, upon such execution, cause the one or more computers to perform operations comprising:
   accessing, by a client device, a first credential that is granted by a first credential granting authority;
   after accessing the first credential that is granted by the first credential granting authority, receiving, by the client device, a request to set up biometric identification for the first credential and the first credential granting authority;
   in response to receiving the request to set up biometric identification for the first credential and the first credential granting authority, providing, for display by the client device, data indicating instructions for a user to provide a biometric identifier;
   receiving, by the client device, the biometric identifier;
   accessing, by the client device, a second credential that is granted by a second credential granting authority;
   after accessing the second credential that is granted by the second credential granting authority, receiving, by the client device, a request to set up biometric identification for the second credential and the second credential granting authority; and
   in response to receiving the request to set up biometric identification for the second credential and the second credential granting authority, providing, for display by the client device, data indicating that the second credential granting authority has authorized biometric identification using the biometric identifier received for the first credential granting authority.

16. The medium of claim 15, wherein receiving the biometric identifier comprises receiving at least one of a voiceprint, a retina scan, an iris scan, and a fingerprint.

17. The medium of claim 15, wherein receiving the biometric identifier comprises:
   providing, for display by the client device, a text string and an instruction for the user to speak the text string;
   receiving audio data that corresponds to an utterance of the text string;
   determining that the audio data corresponds to the text string;
   based on determining that the audio data corresponds to the text string, providing, for display by the client device, data indicating an acceptance of the audio data as the biometric identifier.

18. The medium of claim 15, wherein receiving the biometric identifier comprises:
   providing, for display by the client device, a text string and an instruction for the user to speak the text string;
   receiving audio data that corresponds to an utterance of the text string;
   determining that a quality of the audio data does not satisfy a quality threshold;
   based on determining that the quality of the audio data does not satisfy the quality threshold, providing, for display by the client device, a different text string and an instruction for the user to speak the different text string.

19. The medium of claim 15, wherein the operations further comprise:
   receiving, by the client device, a request to access a resource restricted by the second credential granting authority; and
   providing, for display by the client device, a request for the biometric identifier.

20. The medium of claim 19, wherein the operations further comprise:
- receiving, by the client device and from the user, biometric data;
- providing, for display by the client device, data indicating that the biometric data does not match the biometric identifier; and
- in response to providing the data indicating that the biometric data does not match the biometric identifier, providing, for display by the client device, a request for a different biometric identifier.

* * * * *